(12) United States Patent
Lam et al.

(10) Patent No.: US 10,845,594 B1
(45) Date of Patent: Nov. 24, 2020

(54) PRISM BASED LIGHT REDIRECTION SYSTEM FOR EYE TRACKING SYSTEMS

(71) Applicant: Facebook Technologies, LLC, Menlo Park, CA (US)

(72) Inventors: Wai Sze Tiffany Lam, Redmond, WA (US); Yusufu Njoni Bamaxam Sulai, Bothell, WA (US); Robin Sharma, Redmond, WA (US); Ying Geng, Sammamish, WA (US); Lu Lu, Seattle, WA (US); Jacques Gollier, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 247 days.

(21) Appl. No.: 15/849,860

(22) Filed: Dec. 21, 2017

(51) Int. Cl.
*G02B 27/01* (2006.01)
*G02B 5/04* (2006.01)
*G02B 27/00* (2006.01)
*G06F 3/01* (2006.01)
*F21V 8/00* (2006.01)

(52) U.S. Cl.
CPC ......... *G02B 27/0172* (2013.01); *G02B 5/045* (2013.01); *G02B 27/0093* (2013.01); *G02B 6/0091* (2013.01); *G02B 2027/0138* (2013.01); *G02B 2027/0178* (2013.01); *G06F 3/013* (2013.01)

(58) Field of Classification Search
CPC .............. G02B 27/0172; G02B 5/045; G02B 27/0093; G02B 6/0091; G02B 2027/0178; G02B 2027/0138; G06F 3/013; G03H 2226/05
See application file for complete search history.

(56) References Cited

U.S. PATENT DOCUMENTS

| | | | |
|---|---|---|---|
| 7,656,585 B1 | 2/2010 | Powell et al. | |
| 8,384,999 B1* | 2/2013 | Crosby | G02B 27/0172 349/11 |
| 9,341,850 B1* | 5/2016 | Cakmakci | G02B 27/0172 |
| 9,658,453 B1* | 5/2017 | Kress | G02B 27/1086 |
| 2003/0214710 A1 | 11/2003 | Takahashi et al. | |
| 2009/0201589 A1* | 8/2009 | Freeman | H04N 9/3129 359/630 |
| 2012/0002295 A1 | 1/2012 | Dobschal et al. | |
| 2013/0050851 A1* | 2/2013 | Machida | G02B 3/08 359/742 |

(Continued)

*Primary Examiner* — Kimberly N. Kakalec
(74) *Attorney, Agent, or Firm* — Fenwick & West LLP

(57) ABSTRACT

A head-mounted device (HMD) contains a display, an optics block, a redirection structure, and an eye tracking system. The display is configured to emit image light and provide it to an eye of a user. The optics block is configured to direct the emitted light in order to allow it to reach the eye. The eye tracking system contains a camera, an illumination source, and a controller. The camera is configured to capture image data using infrared light reflected from the eye. The controller is configured to use this image data to determine eye tracking information. The illumination source is configured to illuminate the eye with infrared light for the purpose of taking eye tracking measurements. The redirection structure is configured to direct infrared light reflected from the eye to the eye tracking system. In multiple embodiments, redirection structures may comprise prism arrays, lenses, liquid crystal layers, or grating structures.

16 Claims, 8 Drawing Sheets

(56) References Cited

U.S. PATENT DOCUMENTS

| | | |
|---|---|---|
| 2016/0223819 A1 | 8/2016 | Liu et al. |
| 2017/0329398 A1 | 11/2017 | Raffle et al. |
| 2017/0336552 A1* | 11/2017 | Masuda ................. G02B 27/02 |
| 2018/0113508 A1 | 4/2018 | Berkner-Cieslicki et al. |
| 2018/0203505 A1 | 7/2018 | Trail et al. |
| 2018/0239177 A1 | 8/2018 | Oh |
| 2018/0275409 A1* | 9/2018 | Gao .................... H04N 13/344 |
| 2019/0101757 A1* | 4/2019 | Martinez ............ G02B 27/0172 |
| 2019/0101767 A1* | 4/2019 | Geng ....................... G02B 3/08 |
| 2019/0129174 A1* | 5/2019 | Perreault ............ G02B 27/0961 |

* cited by examiner

US 10,845,594 B1

PRISM BASED LIGHT REDIRECTION SYSTEM FOR EYE TRACKING SYSTEMS

BACKGROUND

The present disclosure relates generally to light redirection, and specifically relates to a prism based light redirection system for eye tracking systems.

Eye tracking refers to the process of detecting the direction of a user's gaze, which may comprise detecting an orientation of an eye in 3-dimensional (3D) space. Eye tracking in the context of headsets used in, e.g., virtual reality and/or augmented reality applications can be an important feature. Conventional systems commonly use, e.g., a small number of infrared light sources (e.g., 8) to illuminate the eye light, and a camera is used to image a reflection of the light sources from the eye. Traditionally, eye tracking systems use beam splitters to redirect light reflected from the eye to the camera. However, beam splitters are often large, cumbersome, and unsuitable for HMDs used in AR and VR systems.

SUMMARY

A redirection structure transmits light in a first band (e.g., visible light) and redirects light to one or more locations in a second band (e.g., infrared light). In some embodiments, the redirection structure includes a plurality of prisms (i.e., a prism array) that act to redirect light in the second band to a first position. The plurality of surfaces may be coated with a dichroic material that is transmissive in the first band and reflective in the second band. In some embodiments, an immersion layer is overmolded onto the redirection structure to form an immersed redirection structure. The immersion layer may be index matched to the redirection structure. Additionally, in some embodiments, one or more surfaces of the immersed redirection structure may be shaped (e.g., concave, convex, asphere, freeform, etc.) to adjust optical power of the immersed redirection structure.

The redirection structure may be integrated into a head-mounted display (HMD). In some embodiments, a HMD includes a display element, a redirection structure, an illumination source, and a camera assembly. The display element outputs image light in a first band (e.g., visible light) of light through a display surface of the display element. The redirection structure transmits light in the first band and directs light in a second band (e.g., infrared light) different than the first band to a first position. The illumination source (e.g., part of a tracking system) illuminates an eyebox (a region in space occupied by an eye of the user) with light in the second band. The camera (e.g., part of an eye tracking system) is located in the first position, and is configured to capture light in the second band corresponding to light reflected from an eye of the user and directed toward the first position by the redirection structure. Additionally, in some embodiments, the HMD includes a controller (e.g., part of the tracking system) that generates tracking information (e.g., gaze location and/or facial expressions).

Figure 1:
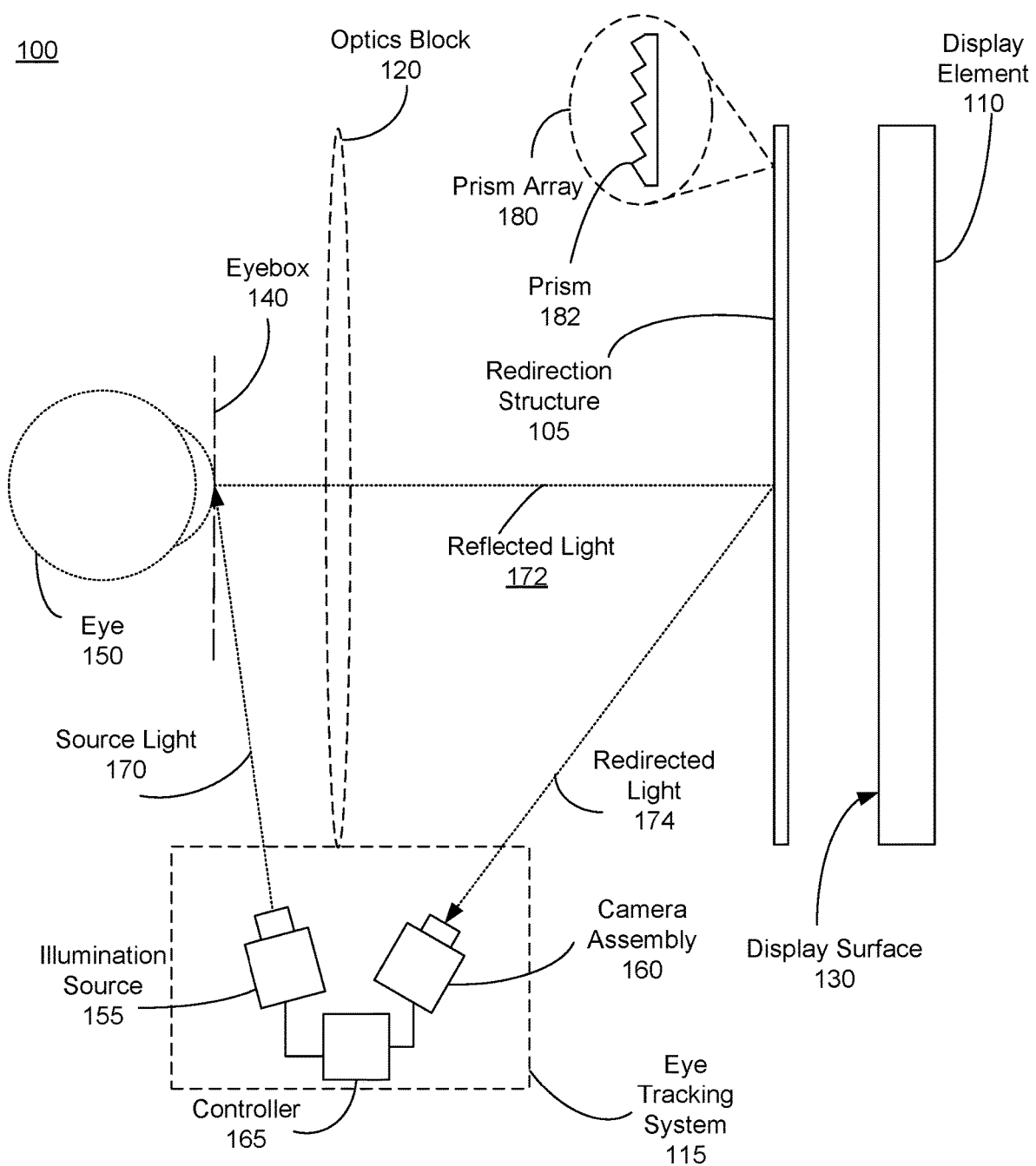
FIG. 1 is a diagram of a cross section of a portion of a display block of an HMD (not shown), in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A head-mounted display (HMD) provides users with audio and visual media content. The HMD includes an electronic display and an eye tracking system. Some embodiments also include an optics block. The electronic display outputs image light in a first band (e.g., visible band).

The optics block is configured to direct this light to an eyebox. The eyebox is a location in space where a user eye would be positioned. The optics block includes one or more devices that focus the light emitted at the display and direct that light towards the eye. The optics block may include, for example, one or more lenses. The eye positioned behind the eyebox makes movements in response to the image light received by the display. This movement is tracked by the eye tracking system.

The eye tracking system receives image light reflected from the eye and generates eye tracking information using the received image light. The eye tracking system comprises an illumination source, a camera, and a controller. In an HMD embodiment, the eye tracking system is located within the assembly that is mounted to the head and held in place with the strap. In an embodiment where the image delivery system is a pair of augmented reality glasses, the eye tracking system is located in the frame of the glasses. In order to track the movements of the eye, the eye is illuminated with a second band light. The illumination source illuminates the eye with light in the second band. The eye scatters and reflects this light and the light is redirected to the camera by a redirection structure. Multiple embodiments of the redirection structure are outlined in this specification. After the eye scatters this light and it is redirected, the camera captures the image data. The controller converts this image data into eye tracking information. The HMD is configured to adjust the image light based on this eye tracking information. The HMD may be part of, e.g., a virtual reality (VR) system, an augmented reality (AR) system, a mixed reality (MR) system, or some combination thereof.

The redirection structure is coupled to the electronic display and is configured to transmit light in the first band and redirect light in a second band (e.g., infrared band) light towards a camera of the eye tracking system. The redirection structure is placed between the eyebox and the display. The redirection structure changes the direction of light scattered or reflected from the eye after the eye is illuminated by an illumination source within the eye tracking system. The redirection structure comprises a prism array coupled to the electronic display. In one embodiment, the prism array is overmolded with a layer of material that has the same refractive index as the material of which the prisms are composed. Both embodiments are discussed in greater detail below.

The redirection structure is coupled to the electronic display and is configured to transmit light in the first band and redirect light in a second band (e.g., infrared band) light towards a camera of the eye tracking system. The redirection structure is placed between the eyebox and the display. The redirection structure changes the direction of light scattered or reflected from the eye after the eye is illuminated by an illumination source within the eye tracking system. In some embodiments, the redirection structure is coupled to this display itself. In other embodiments, the redirection structure is separated from the display by air. In some embodiments, the redirection structure leverages properties of the material of which it is made (e.g., the refractive index of the material), in order to change the angle of light normally incident upon its surface. In one embodiment, the redirection structure is made of materials of multiple refractive indices and refracts light in the first band differently than it refracts light in the second band. In another embodiment, the topography of the redirection structure is calibrated to change the angle at which the light is refracted. In some embodiments, a reflective coating is employed to reflect light in the second band. The redirection structure partially transmits and partially reflects light for any light band of interest. In embodiments with coatings, the redirection structure can adjust a ratio of transmitted light to reflected light.

The redirection structure embodiments discussed used by the HMD provides many advantages over existing light redirection methods used in head-mounted displays. Traditionally, bulky beam splitters have been used to redirect light with these systems. The redirection structures disclosed herein are more compact than beam splitters and are therefore suited to being mounted in HMDs or augmented reality glasses. In addition, some redirection structure embodiments reduce the screen door effect that is observed when viewing image light provided by the display.

FIG. 1 is a diagram of a portion 100 of a display block of an HMD (not shown), in accordance with an embodiment. As shown in FIG. 1, the display block includes a redirection structure 105, a display element 110, and an eye tracking system 115. In some embodiments, the display block may also include an optics block 120.

The display element 110 displays images to the user. In various embodiments, the display element 110 may comprise a single electronic display element or multiple electronic displays elements (e.g., a display element for each eye of a user). Examples of the display element 110 include: a liquid crystal display (LCD), an organic light emitting diode (OLED) display, an active-matrix organic light-emitting diode display (AMOLED), a quantum organic light emitting diode (QOLED) display, a quantum light emitting diode (QLED) display, a transparent organic light emitting diode (TOLED) display, some other display, or some combination thereof. In some embodiments, the display element 110 is a waveguide display. In the waveguide display element, the display element 110 may be coupled to a set of optical elements. Examples of these optical elements include a liquid crystal lens, a variable focusing lens, a thin lens, some other lens, or some combination thereof. The display element 110 emits content within a first band of light (e.g., in a visible band of 400-700 nanometers). The display element 110 includes a display surface 130. The display surface 130 is a surface of the display element 110 that emits light toward an eyebox 140. The eyebox 140 is a region in space that is occupied by the eye 150.

The eye tracking system 115 tracks movement of the eye 150. Some or all of the eye tracking system 115 may or may not be in a line of sight of a user wearing the HMD. The eye tracking system 115 is typically located off-axis to avoid obstructing the user's view of the display element 110, although the eye tracking system 115 may alternately be placed elsewhere. Also, in some embodiments, there is at least one eye tracking system 115 for the user's left eye and at least one eye tracking system 115 for the user's right eye. In some embodiments, only one eye tracking system 115 may track both the left and right eye of the user.

The eye tracking system 115 may include one or more illumination sources 155, one or more cameras 160, and a controller 165. The eye tracking system 115 determines eye tracking information using data (e.g., images) captured by the camera or cameras 160 of the eye 150. Eye tracking information describes a position of an eye of the user. Eye tracking information may include, e.g., gaze angle, eye orientation, inter-pupillary distance, vergence depth, some other metric associated with tracking an eye, or some combination thereof. Some embodiments of the eye tracking unit have different components than those described in FIG. 1.

An illumination source 155 illuminates a portion of the user's eye 150 with light 160 in the second band of light (e.g., IR light with a wavelength of ~780-2500 nanometers) that is different from the first band of light (e.g., visible light) associated with content from the display element 110. Examples of the illumination source 155 may include: a laser (e.g., a tunable laser, a continuous wave laser, a pulse laser, other suitable laser emitting infrared light), a light emitted diode (LED), a fiber light source, another other suitable light source emitting infrared and/or visible light, or some combination thereof. In various embodiments, the illumination source 155 may emit visible light. In some embodiments, the eye tracking system 115 may include multiple illumination sources 155 for illuminating one or more portions of the eye 150. In some embodiments, the light emitted from the one or more illumination sources 155 is a structured light pattern. While the illumination source 155 in FIG. 1 is shown as directly illuminating the eye 150, in alternate embodiments, the illumination source 155 may, e.g., illuminate portions of the redirection structure 105, and the illuminated portions reflect emitted light in the second band toward the eyebox 140.

Reflected and/or scattered light, collectively referred to as reflected light 172, from the illuminated portion of the eye 150 is transmitted by the optics block 120 (if present), and re-directed by the redirection structure 105 to the camera assembly 160. Accordingly, the redirection structure 105 separates the reflected light 172 in the second band (e.g., IR light) from the light in the first band (e.g., visible light) of the display element 110.

The camera assembly 160 captures one or more images of the illuminated portion of the eye 150 using the redirected light 174. The camera assembly 160 includes one or more cameras that captures images in at least the second band of light, and more generally, in the band of light emitted by the illumination source 155. In some embodiments, the camera assembly 160 may also be configured to captures images in other bands of light (e.g., the first band). In some embodiments, the camera assembly 160 may include, e.g., one or two-dimensional detector arrays (e.g., linear photodiode array, CCD array, CMOS array, or some combination thereof). In some embodiments, the sensor plane of the camera is tilted with regards to the camera's lens, following the Scheimpflug condition, such that the image is in focus across the whole sensor plane. The capture of the redirected light 174 created image data that allows the controller 165 to identify locations of reflections of light from the one or more illumination sources 155.

The controller 165 determines eye tracking information using data (e.g., captured images) from the one or more cameras. For example, in some embodiments, the controller 165 identifies locations of reflections of light from the one or more illumination sources 155 in an image of the eye 150, and determines a position and an orientation of the eye 150 based on the shape and/or locations of the identified reflections. In cases where the eye 150 is illuminated with a structured light pattern, the controller 165 can detect distortions of the structured light pattern projected onto the eye 150, and can estimate a position and an orientation of the eye 150 based on the detected distortions. The controller 165 can also estimate a pupillary axis, a gaze angle (e.g., corresponds to a foveal axis), a translation of the eye, a torsion of the eye, and a current shape of the eye 150 based on the image of the illumination pattern captured by the camera 160.

The redirection structure 105 transmits light in the first band and reflects light within a second band. For example, the redirection structure 105 may transmit light within a visible band (e.g., 400-700 nanometers (nm)), and may reflect light within an infrared (IR) band (e.g., above 780 nm). The redirection structure 105 comprises a prism array 180. The prism array 180 is a two-dimensional array of prisms 182. In some embodiments, each prism 182 is the same. In alternate embodiments, at least one prism 182 is different (e.g., in shape, in material, in coating, etc.) from some other prism in the prism array 180. The prism array 180 is coupled to the display surface 130. Each prism 182 has multiple facets. The facets shown in FIG. 1 are flat, but in some embodiments, one or more of the facets are curved to impart some optical power on the redirected light 174. A size of the each prism 182 may range from, e.g., a sub-micron grating structure to a 5 mm facet dimension, and accordingly, a prism density of the prism array 180 may range from, e.g., 10 facets to over 100,000 of sub-wavelength grating groves over 50 mm. A pitch between facets may be constant or varied, and may range be on the order of mm to the order of sub-microns (if the grating structure is included). Moreover, the pixel array 180 acts to reduce fixed pattern noise (i.e., screen door effect as described in detail below with regard to FIGS. 7A-7B) in light emitted from the display element 110. More specifically, the prism array 180 blurs light emitted from individual pixels in the display element 110. This blurring allows for dark spots between individual colors to be masked.

The facets of the prisms 182 are shaped to direct light to specific locations. For example, some of the facets in FIG. 1 are shaped to direct the redirected light 174 toward the camera assembly 160. In some embodiments, some or all of the prisms in the prism array 180 are pyramidal in shape. Alternatively, the facets may be shaped such that the facets form different portions of a Fresnel lens. In some embodiments, the prism array 180 is spatially varying. For example, the topography of the prism array may resemble that of an off-axis Fresnel lens. This allows the intensity of second band light 174 redirected by the redirection structure 105 to be maximized. In this embodiment, The prisms 182 are made of a material that is substantially transparent to light in the first band. The prisms 182 may be composed of, e.g., glass, polymer, some other material that is substantially transparent to light in the first band, or some combination thereof. In one embodiment, the light in the second band 172 scattered from the eye is normally incident on the prism array 180. In some embodiments, some or all of the facets of the prisms 172 are coated with a dichroic material (i.e., a hot mirror). The dichroic material reflects light in the second band, but substantially transmits light in the first band. The dichroic material may be, e.g., thin metal films (e.g., gold), indium tin oxide, zinc oxide, some other material that is transparent in the first band of light and reflective in the second band of light, or some combination thereof.

Optionally, the display block includes the optics block 120. The optics block 120 magnifies received visible image light from the display element 110, corrects optical errors associated with the image light, and presents the corrected image light to the eye 150. The optics block 120 includes one or more optical elements. An optical element is, e.g., an aperture, a pancake lens, a liquid crystal lens, a Fresnel lens, a convex lens, a concave lens, a filter, any other suitable optical element that affects the image light emitted from the display element 110, or some combination thereof. Moreover, the optics block 120 may include combinations of different optical elements. In some embodiments, one or more of the optical elements in the optics block 120 may have one or more coatings, such as partial reflectors or anti-reflective coatings. In some embodiments, the optics block 120 is coupled to the display element 110. For example, in an augmented or mixed reality embodiment, the optics block 120 is coupled to the waveguide display element 110. In other embodiments, such as in a virtual reality HMD environment, the optics block is placed between the eye 150 and the display element 110.

Magnification of the image light by the optics block 120 allows the display element 110 to be physically smaller, weigh less, and consume less power than larger displays. Additionally, magnification may increase a field of view of the displayed content. For example, the field of view of the displayed content is such that the displayed content is presented using almost all (e.g., 110° diagonal), and in some cases all, of the user's instantaneous field of view. In some embodiments, the optics block 120 is designed so its effective focal length is larger than the spacing to the display element 110, which magnifies the image light projected by the display element 110. Additionally, in some embodiments, the amount of magnification may be adjusted by adding or removing optical elements.

The optics block 120 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal comatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the display 150 for display is pre-distorted, and the optics block 120 corrects the distortion when it receives image light from the display element 110 generated based on the content.

In some embodiments, the optics block 120 may include one or more varifocal elements. A varifocal element is an optical element that may be adjusted to vary optical power of light from the display element 110 being presented to the user. The adjustment may be, e.g., by adjusting an optical power of the optical element and/or adjusting a position of the optical element relative to the display element 110. The varifocal element may be coupled to the eye tracking system 115 to obtain eye tracking information determined by the eye tracking system 115. The varifocal element may be configured to adjust focus of image light emitted from the display element 110, based on the determined eye tracking information obtained from the eye tracking system 115. In this way, the varifocal element can mitigate vergence-accommodation conflict in relation to the image light. The varifocal element varies focus of the image light propagated through the optical block 120 towards the eyebox 140.

Figure 2:
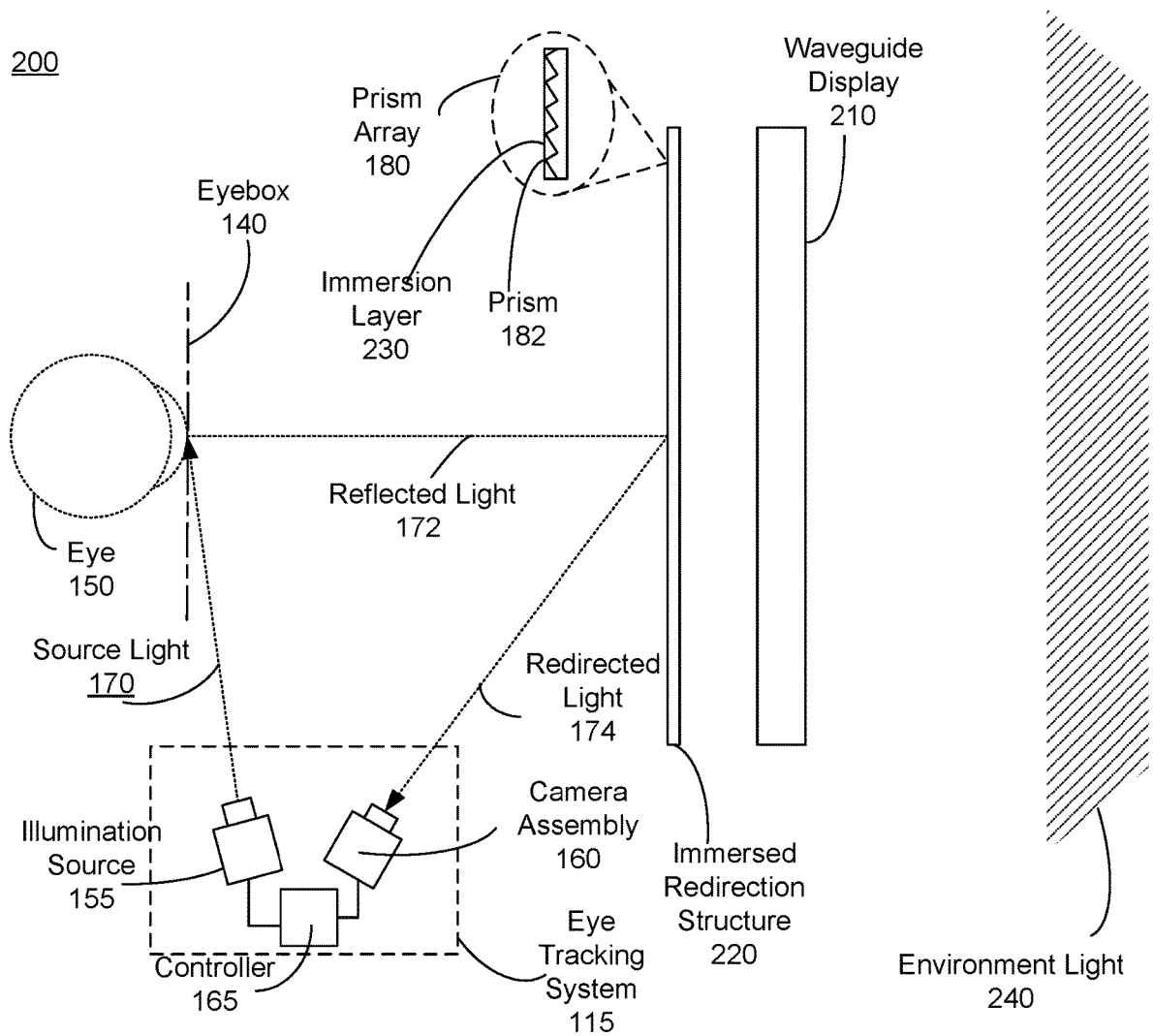
FIG. 2 is a diagram of a cross section of a portion of a display block of an HMD (not shown) with an immersed redirection structure, in accordance with an embodiment.

FIG. 2 is a cross section 200 of a portion of a display block of an HMD (not shown) with an immersed redirection structure 220, in accordance with an embodiment. The display block is substantially similar to the display block of FIG. 1, except that the display element 110 is replaced with a waveguide display 210, and the redirection structure 105 is replaced with the immersed redirection structure 220. The immersed redirection structure 220 comprises the prism array 180 of FIG. 1 overmolded with an immersion layer 230. In addition, the display block 200 is configured for use in AR and/or MR systems.

In AR and/or MR applications, such as in the embodiment of FIG. 2, the waveguide display 210 is illuminated by environment light 240. The waveguide display 210 is substantially transparent to portions of the environmental light 240 (e.g., visible light) in the first band of light, and emits light in a first band of light toward the eyebox 140. The waveguide display 210 includes a source and a waveguide. The source may be, e.g., a 1D or 2D source. Light from the source is coupled into the waveguide where it is expanded and output toward the eyebox 140 as image content. In some embodiments, the waveguide display 210 includes portions of an optics block. For example, the waveguide display 210 may include a varifocal element (e.g., one or more liquid crystal lenses) that adjust a location of an image plane at which content is presented to a user. And the location of the image plane is determined using the eye tracking information provided by the eye tracking system 115. In some embodiments, the waveguide display 210 may also include one or more optical elements (e.g., thin lens) that compensate for optical power that is added/subtracted by the varifocal element in placing the image plane.

The immersed redirection structure 220 redirects the reflected light 172 in the second band toward the camera assembly 160 as redirected light 174. As noted above, the immersed redirection structure 220 is the redirection structure 105 of FIG. 1 overmolded with an immersion layer 230. The immersion layer 230 is of the same refractive index as that of the prisms 182 within the prism array 180. In some embodiments, the immersion layer 230 is also made out of the same material (e.g., a UV curable material) as the prism array 180. In other embodiments, the immersion layer 230 is an index-match glue.

The immersion layer 230 reduces optical aberration that would otherwise occur in light (both light from the waveguide display 210 and environmental light 240) in the first band passing through the prism array 180 toward the eyebox 140. This is because light from the waveguide display 210 and the environmental light 240 interact with the redirection structure as a single piece of material (the immersion layer is index matched to the prism array). Note—as shown an outer surface of the immersion layer (i.e., air-immersion layer interface) is substantially flat. Accordingly, light in the first band is not substantially affected by transmission through the immersed redirection structure 220. Note in alternate embodiments, the outer surface may be curved (e.g., concave, convex, freeform, etc.) to, e.g., adjust optical power of the light in the first band being transmitted toward the eyebox 140. In some embodiments, the immersed redirection structure 220 is coupled to a substrate. This substrate can also be flat, curved, or some other shape.

Some or all of the prisms 182 in the prism array 180 in FIG. 2 are coated with a dichroic material that is reflective in the second band of light, but transmissive in the first band of light. Accordingly, the coated prisms redirect light in the second band toward the camera assembly 160, while being substantially transmissive to light in the first band. Note, that in some embodiments, the prism array 180 and the immersion layer 230 may have a relatively high index of refraction (e.g., >2.5). The high index of refraction allows for more refraction of light in the second band reflecting from a dichroic coating on a prism facet at the air-coating interface. Accordingly, the camera assembly 160 may be placed closer along the Z direction to the immersed redirection structure 220, potentially resulting in a smaller form factor for the display block 200.

Figure 3:
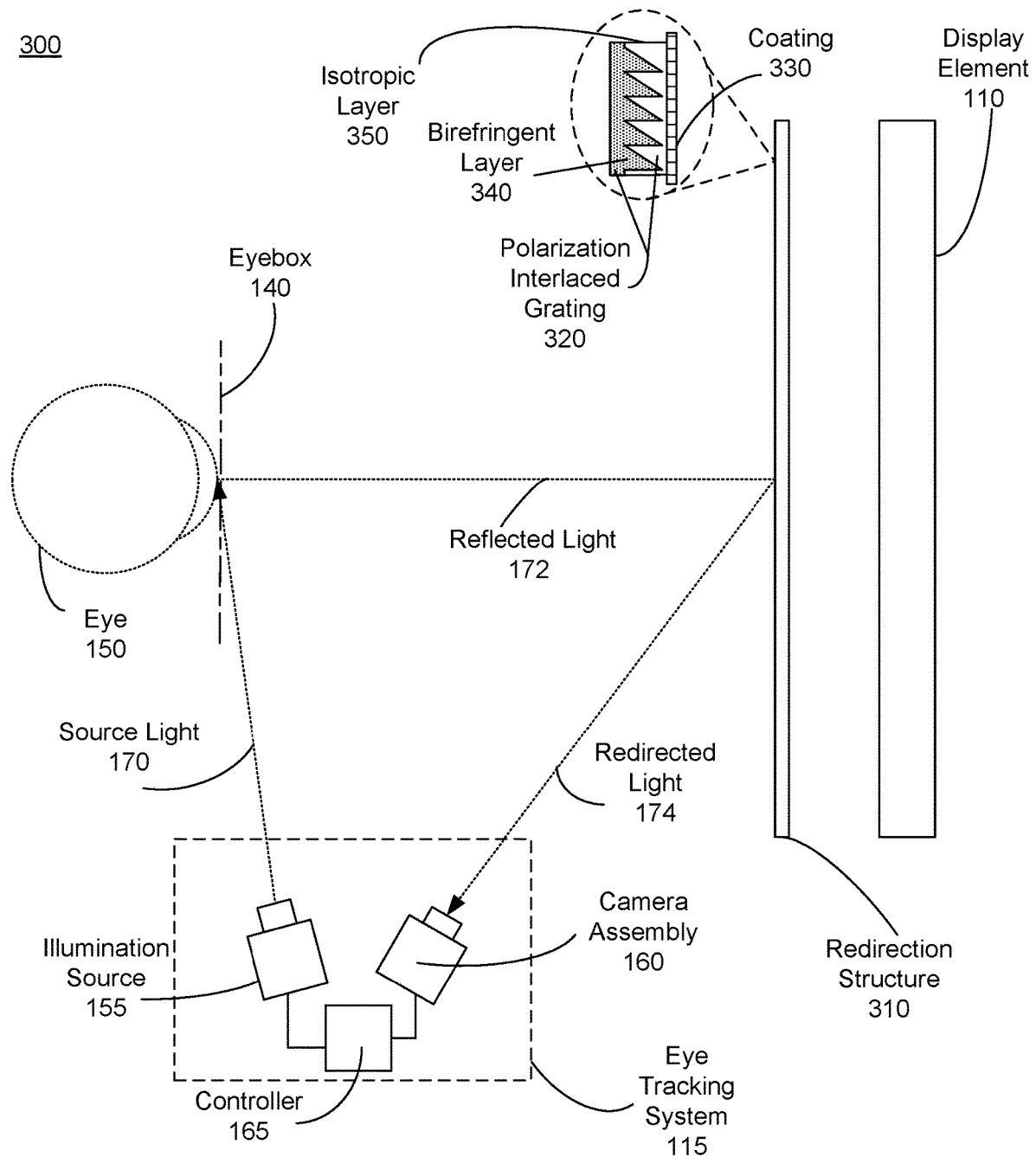
FIG. 3 is a cross section of a portion of a display block of an HMD (not shown) with a redirection structure that includes a polarization interlaced grating, in accordance with another embodiment.

FIG. 3 is a cross section 300 of a portion of a display block of an HMD (not shown) with a redirection structure 310 that includes a polarization interlaced grating 320, in accordance with another embodiment. The display block is substantially similar to the display block in FIG. 1, except that the redirection structure 105 is replaced with the redirection structure 310, and does not include the optics block 120 (in alternate embodiments the optics block 120 may be included between Redirection structure 310 and Display Element 110).

In the embodiment of FIG. 3, the redirection structure 310 comprises a polarization interlace grating 320 and a coating 330. As discussed in detail below, the polarization interlace grating 320 selectively transmits or reflects light based on their polarization. The polarization interlace grating 320 includes a birefringent layer 340 and an isotropic layer 350.

The birefringent layer 340 is a layer of birefringent material that is overmolded to the surface of the isotropic layer 350. In one embodiment, the isotropic layer 350 can go before the birefringent grating 340. In one embodiment, the birefringent layer 340 is circularly birefringent. In other embodiments, the birefringent layer 340 is linearly birefringent. The birefringent layer 340 may be a solid (e.g., Calcite and quartz) or a liquid. In one embodiment, the birefringent layer 340 is filled with photopolymerized liquid crystal. In another embodiment, the birefringent layer 340 is filled with chiral liquid crystal. In some embodiments, the birefringent layer 340 is etched to form a grating.

The isotropic layer 350 is a grating. The isotropic layer 350 with refractive index n1 is composed of a different material than that of the birefringent layer 340 with ordinary refractive index n1 and extraordinary refractive index n2. In one embodiment, the isotropic layer 350 is a blazed grating. The blaze angle may range from 20 to 60 degrees. The line spacing or grating pitch may be on the order of microns, and can be optimized based on grating equation. For example, if n1=1.3 and n2=1.6, the blaze angle is 35 degree, and grating pitch is about 4 to 5 microns. The grating height, pitch, and profile within the isotropic grating 350 may both be optimized to produce a high diffraction efficiency, in order to reflect the second band light at a target angle to reach camera assembly 160.

The coating 330 in the embodiment of FIG. 3 is substantially the same as the dichroic coating applied to the prisms 182 in the embodiment of FIG. 2 except that it is applied to a different location on the redirection structure 310. In this embodiment, the coating 330 is applied to a surface (e.g., a surface that receives light from the display element 110) of the polarization interlace grating 320. The redirection structure 310 is configured to interact differently with light in the first and second bands. For example, if light in the first band is x-polarized or right circular polarized, it is transmitted by the polarization interlaced grating 320. In contrast, if light is in the second band is y-polarized or left circularly polarized, it is diffracted by the polarization interlaced grating 320 toward the camera assembly 160.

Figure 4:
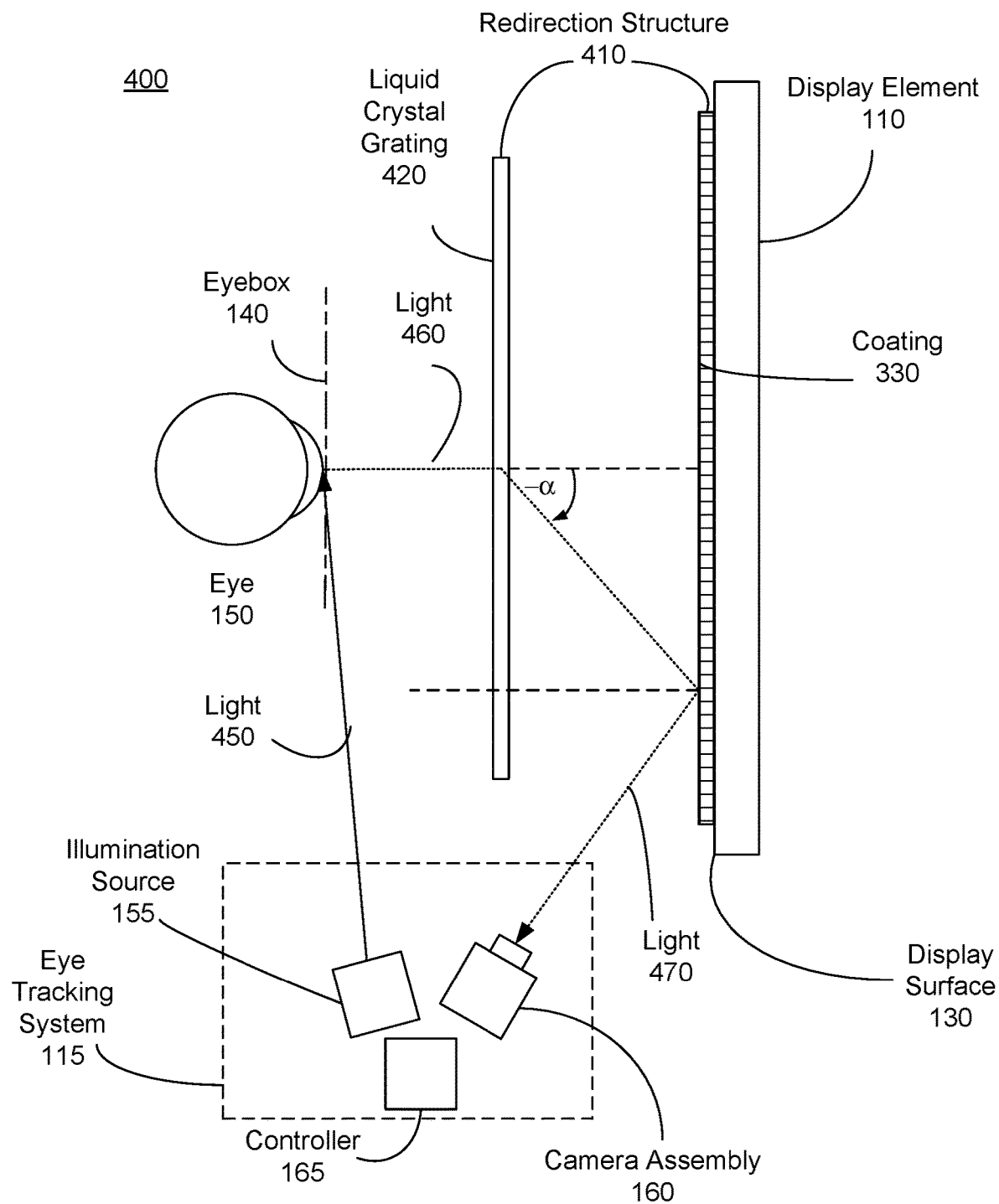
FIG. 4 shows a cross section of a portion of a display block of an HMD (not shown) with a redirection structure that includes a liquid crystal grating, in accordance with an embodiment.

FIG. 4 shows a cross section of a portion 400 of a display block of an HMD (not shown) with a redirection structure 410 that includes a liquid crystal grating 420, in accordance with an embodiment. The display block is substantially similar to the display block in FIG. 1, except that the redirection structure 105 is replaced with a redirection structure 410, and does not include the optics block 120 (in alternate embodiments the optics block 120 may be included between redirection structure 410 and display element 110).

The redirection structure 410 transmits light of a first polarization and band (i.e., first) and diffracts light in a second polarization and band (i.e., second). The redirection structure 410 includes a liquid crystal grating 420 and the coating 330. The liquid crystal grating 420 is situated between the eyebox 170 and the coating 330. In this embodiment, the liquid crystal grating 420 is not coupled directly to the coating. The liquid crystal grating 420 is a geometric phase grating (e.g., Pancharatnam Berry Phase liquid crystal structures).

The liquid crystal grating 420 may be an active type (herein after referred to as an active liquid crystal grating) or a passive type (herein after referred to as a passive liquid crystal grating). An active liquid crystal grating has three optical states (i.e., additive, subtractive, and neutral). In an additive state, the additive state causes the active liquid crystal grating to diffract light at a particular wavelength to a positive angle (+θ). Likewise, in the subtractive state the active liquid crystal grating diffracts light at the particular wavelength to a negative angle (−θ). The neutral state does not cause any diffraction of light (and does not affect the polarization of light passing through the liquid crystal grating 420). The state of an active liquid crystal grating is determined by a handedness of polarization of light incident on the active liquid crystal grating and an applied voltage.

An active liquid crystal grating operates in a subtractive state responsive to incident light with a right handed circular polarization and an applied voltage of zero (or more generally below some minimal value), operates in an additive state responsive to incident light with a left handed circular polarization and the applied voltage of zero (or more generally below some minimal value), and operates in a neutral state (regardless of polarization) responsive to an applied voltage larger than a threshold voltage which aligns liquid crystal with positive dielectric anisotropy along with the electric field direction. Note that if the active liquid crystal grating is in the additive or subtractive state, light output from the active liquid crystal grating has a handedness opposite that of the light input into the active liquid crystal grating. In contrast, if the active liquid crystal grating is in the neutral state, light output from the active liquid crystal grating has the same handedness as the light input into the active liquid crystal grating. In contrast, if the liquid crystal grating 420 is a passive type, the passive liquid crystal grating has two optical states, specifically, the additive state and the subtractive state, and does not have the neutral state. A thickness of the liquid crystal grating 420 is determined such that it is a half-wave for the second band of light (e.g., IR) and a one wave for the first band of light (e.g., visible). In this manner, light the liquid crystal grating 420 does not affect light in the first band, but diffracts light in the second band that is right hand circularly polarized.

The diffracted light is incident on the coating 330. The coating 330 is substantially the same as the coating 330 from FIG. 3 except that it is applied a display surface (i.e., surface of the display that emits content) of the display element 110. Additionally, in some embodiments, the coating 330 is optimized to reflect >90% of the light in the second band at 45° for both (s and p) polarizations.

In this embodiment, the illumination source 145 emits light 450 that is in the second band of light. In some embodiments, the light 450 may be circularly polarized light (e.g., LCP). The light 450 is reflected by the eye 150 as light 460 (note a specular reflection results in a handedness change of circularly polarized light). The light 460 is incident on the liquid crystal grating 420, which acts in a subtractive state for light that is RCP and in the second band. Accordingly, the light 460 is diffracted at an angle of −α toward the coating 330. And the coating 330 reflects the light 460 as light 470 redirected toward the camera assembly 160.

Figure 5:
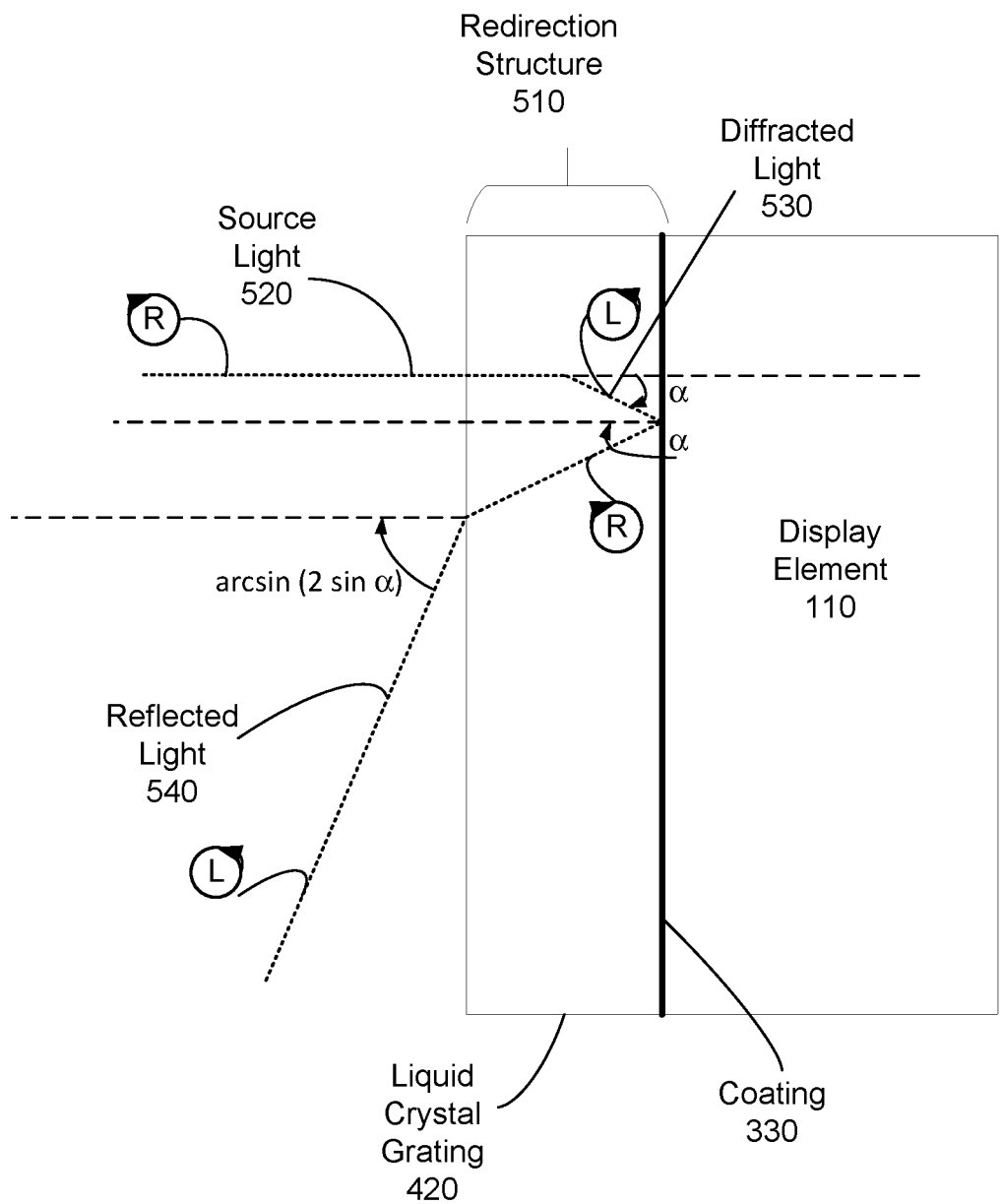
FIG. 5 shows a cross section of a portion a redirection structure that includes a liquid crystal grating coupled to the coating, in accordance with an embodiment.

FIG. 5 shows a cross section of a portion a redirection structure 510 that includes a liquid crystal grating 420 coupled to the coating 330, in accordance with an embodiment. Functionally, the redirection structure 510 is substantially similar to the redirection structure 410, except that the liquid crystal grating 420 is coupled to the display element 110. Note that in alternate embodiments not shown, depending on a desired ray redirection, the liquid crystal grating 420 may be replaced by an off-axis liquid crystal lens.

In this case, light 520 is incident on the liquid crystal grating 420, which acts in a subtractive state for light that is RCP and in the second band. Accordingly, the light 520 is diffracted at an angle of a from an incident ray path to form diffracted light 530, and note that the liquid crystal grating 420 also changes the handedness of the light such that the light 530 is LCP. The light 530 is reflected by the coating 330 because it is in the second band, the reflected light is referred to as light 540. The reflection also causes a change in handedness of the light (i.e., LCP to RCP). The grating is optimized to interact with light of a single wavelength or a band covering a narrow range of wavelengths of the light 540. The light 540 is incident on the liquid crystal grating 420, which acts in a subtractive state for light that is RCP and in the second band, and diffracts the light 530 an angle of arcsin (2*lambda/T)=arcsin(2 sin α) from an incident ray path parallel to the initial path of the light 520 to form light 540, where lambda is the wavelength of the second band and T is the grating period of liquid crystal grating 420.

The coating 330 is designed for the second band to reflect at angle alpha from LCP to RCP. Note that in in some embodiments, LCP reflects to RCP at normal incidence, but that in general, LCP reflects to elliptically polarized light for non-normal incidence. And at some higher incident angle, LCP can reflect to linearly polarized light. In these cases, an additional waveplate may be used to adjust the polarization back to RCP. The waveplate may be a laminate, a coating, or part of the coating 330.

Figure 6A:
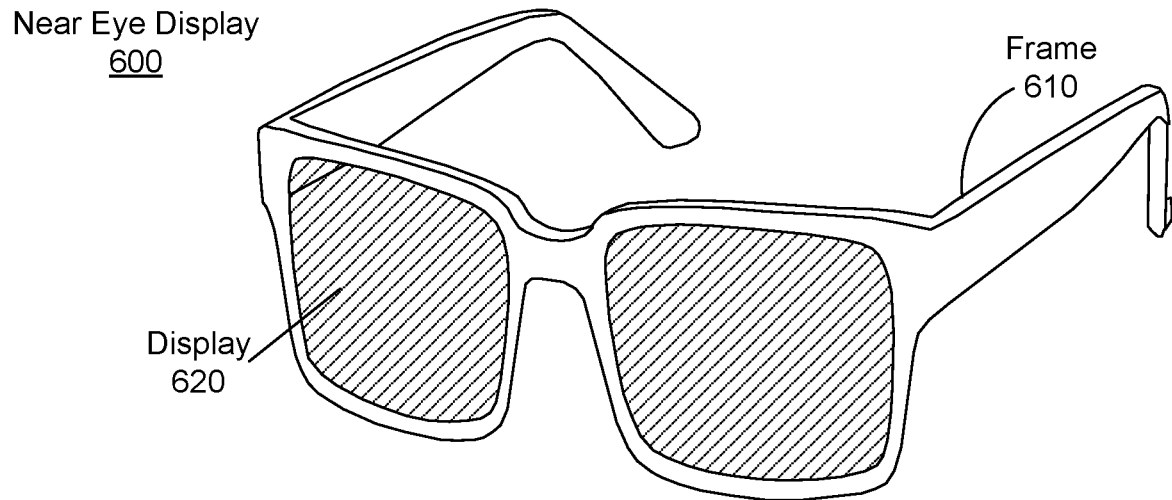
FIG. 6A is a diagram of an HMD, in one embodiment.

FIG. 6A shows a diagram of the HMD, as a near eye display 600, in one embodiment. In this embodiment, the HMD is a pair of augmented reality glasses. The HMD 600 presents computer-generated media to a user and augments views of a physical, real-world environment with the computer-generated media. Examples of computer-generated media presented by the HMD 600 include one or more images, video, audio, or some combination thereof. In some embodiments, audio is presented via an external device (e.g. speakers and headphones) that receives audio information from the HMD 600, a console (not shown), or both, and presents audio data based on audio information. In some embodiments, the HMD 600 may be modified to also operate as a virtual reality (VR) HMD, a mixed reality (MR) HMD, or some combination thereof. The HMD 600 includes a frame 610 and a display 620. In this embodiment, the frame 610 mounts the near eye display 600 to the user's head. The display 620 provides image light to the user.

Figure 6B:
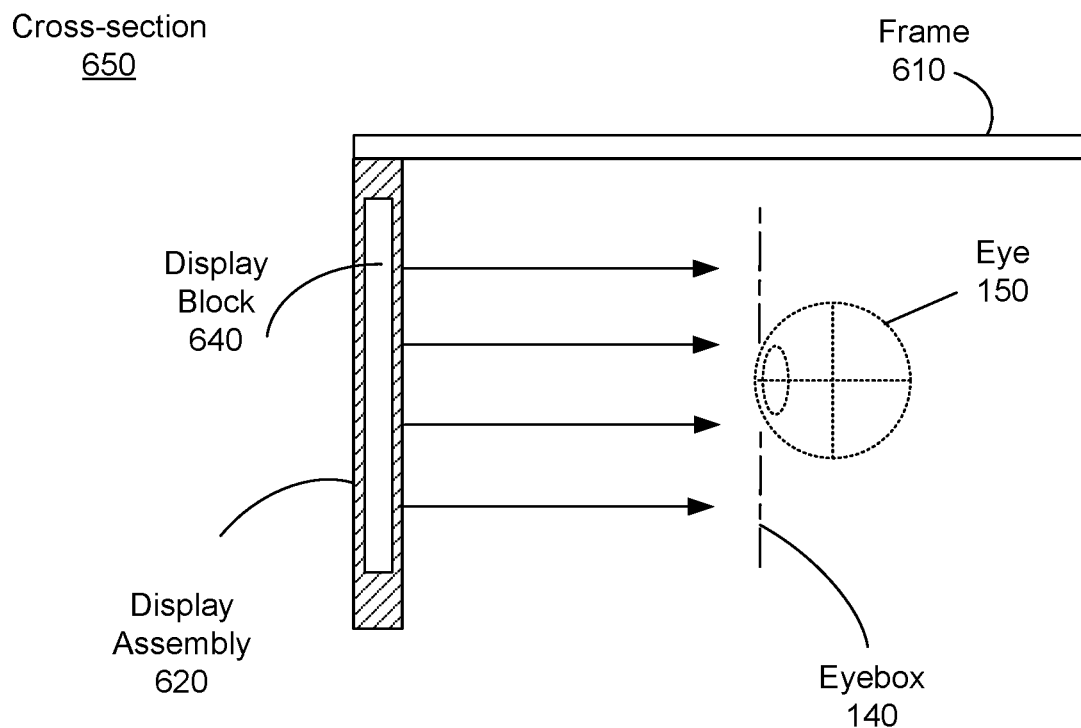
FIG. 6B is a diagram of a cross-section of the HMD, in one embodiment.

FIG. 6B shows a cross-section view 650 of the near eye display 600. This view includes the frame 610, the display assembly 620, a display block 640, and the eye 150. The display assembly 620 supplies image light to the eye 150. The display assembly 620 houses the display block 640, which, in different embodiments, encloses the different types of imaging optics and redirection structures described earlier in this specification. For purposes of illustration, FIG. 6B shows the cross section 630 associated with a single display block 640 and a single eye 150, but in alternative embodiments not shown, another display block which is separate from the display block 630 shown in FIG. 6B, provides image light to another eye of the user.

The display block 640, as illustrated below in FIG. 6B, is configured to combine light from a local area with light from computer generated image to form an augmented scene. The display block 640 is also configured to provide the augmented scene to the eyebox 140 corresponding to a location of a user's eye 150. The eyebox 140 is a region of space that would contain a user's eye while the user is wearing the HMD 600. The display block 640 may include, e.g., a waveguide display, a focusing assembly, a compensation assembly, or some combination thereof. The display block 640 is an embodiment of the display blocks discussed above with regard to FIGS. 1-5.

The HMD 600 may include one or more other optical elements between the display block 640 and the eye 150. The optical elements may act to, e.g., correct aberrations in image light emitted from the display block 640, magnify image light emitted from the display block 640, some other optical adjustment of image light emitted from the display block 640, or some combination thereof. The example for optical elements may include an aperture, a Fresnel lens, a convex lens, a concave lens, a filter, or any other suitable optical element that affects image light. The display block 640 may be composed of one or more materials (e.g., plastic, glass, etc.) with one or more refractive indices that effectively minimize the weight and widen a field of view of the HMD 600.

Figure 7A:
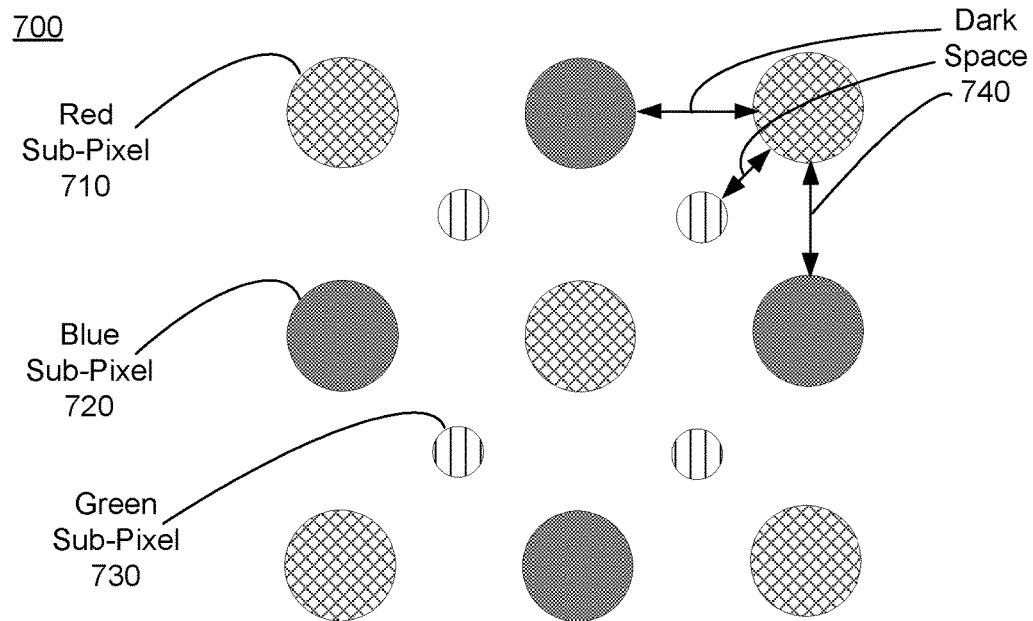
FIG. 7A is an example array of sub-pixels on an electronic display element, in accordance with an embodiment

FIG. 7A is an example array 700 of sub-pixels on the display element 110. The example array 700 shown in FIG. 7A includes red sub-pixels 710, blue sub-pixels 720, and green sub-pixels 730. For example, the array 700 is portion of a PENTILE® display. In other embodiments, the array 700 may be in some other configuration (e.g., RGB).

A dark space 740 separates each sub-pixel from one or more adjacent sub-pixels. The dark space 740 is a portion of the array 700 that does not emit light, and may become visible to a user under certain circumstances (e.g., magnification) causing the screen door effect that degrades image quality. As discussed above in conjunction with FIG. 1, the redirection structure 125 can serve to reduce fixed pattern noise so the dark space 740 between the sub-pixels is not visible to the user (e.g., by blurring each sub-pixel, creating a blur spot associated with each sub-pixel in the image). The blur spots are large enough so adjacent blur spots mask the dark space 740 between adjacent full pixels. In other words, for any display panel, the largest pixel fill-ratio is 100%, if there is no gap at all between sub-pixels. However, to completely get rid of the screen door artifact on the panel side, the pixel fill-ratio may be much greater (e.g., 300%), such that the sub-pixels of different colors are overlapping. This way, when only green pixels are emitting light, for example, when viewed with perfect viewing optics, there would be no gap between the sub-pixels. This is difficult to do for OLED and/or LCD display panels, but it is doable with a diffractive element such as the prism array redirection structure 105.

Figure 7B:
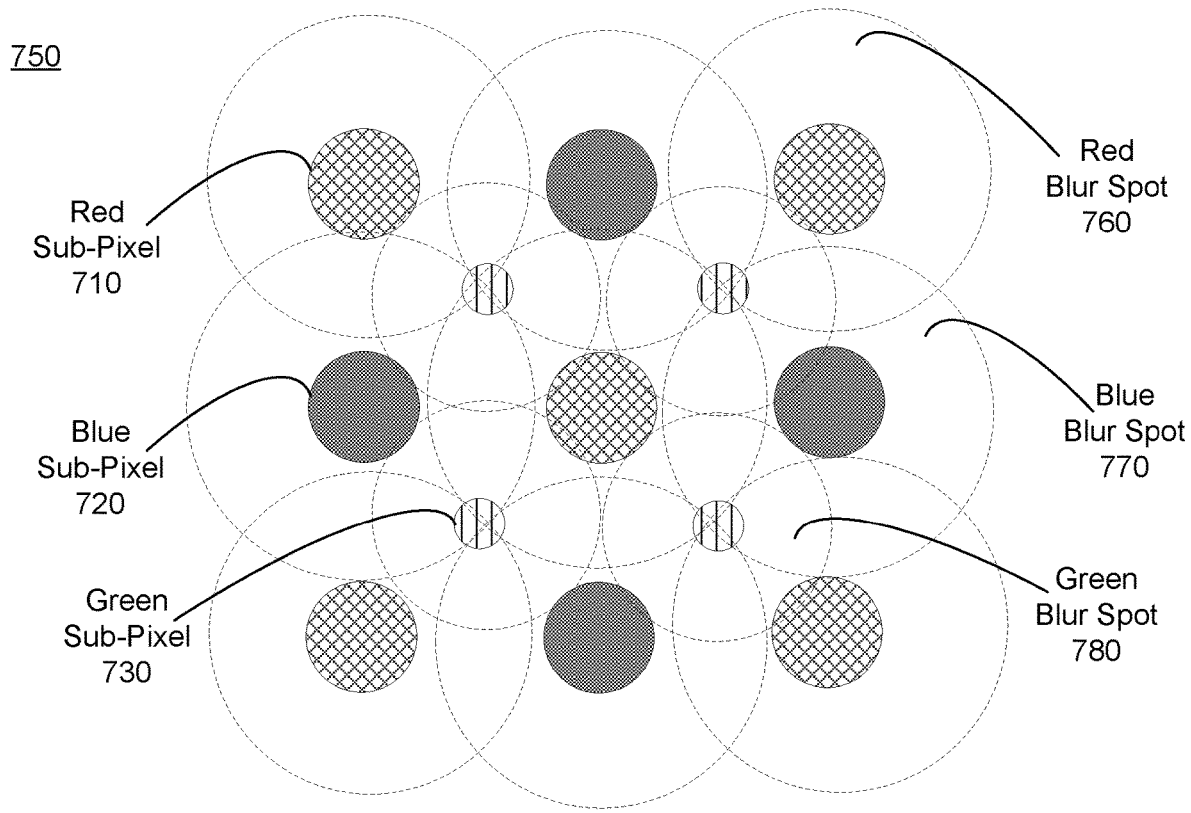
FIG. 7B is an image of an example array of sub-pixels adjusted by an optical block, in accordance with an embodiment.

FIG. 7B is an example illustrating adjustment of image data of the array 700 of FIG. 8A by the redirection structure 105. As shown in FIG. 7B, each of the sub-pixels has an associated blur spot. Specifically, the red sub-pixels 710 have a corresponding red blur spot 760, the blue sub-pixels 820 have a corresponding blue blur spot 770, and the green sub-pixels 730 have a corresponding green blur spot 780. A blur spot is an area filled with an image of a blurred sub-pixel. So long as a blur spot does not overlap with a point of maximum intensity of an adjacent blur spot that is created by a sub-pixel of the same color, the two blur spots are resolvable as two adjacent pixels. In some embodiments, the three sub-pixels all overlap and creates a white pixel. The shape of the blur spot is not necessarily a circle, but is rather an area including the blurred image of a sub-pixel. The redirection structure 105 of FIG. 1 can be configured to blur each sub-pixel so the blur spots mask the dark space 740 between adjacent pixels.

Figure 8:
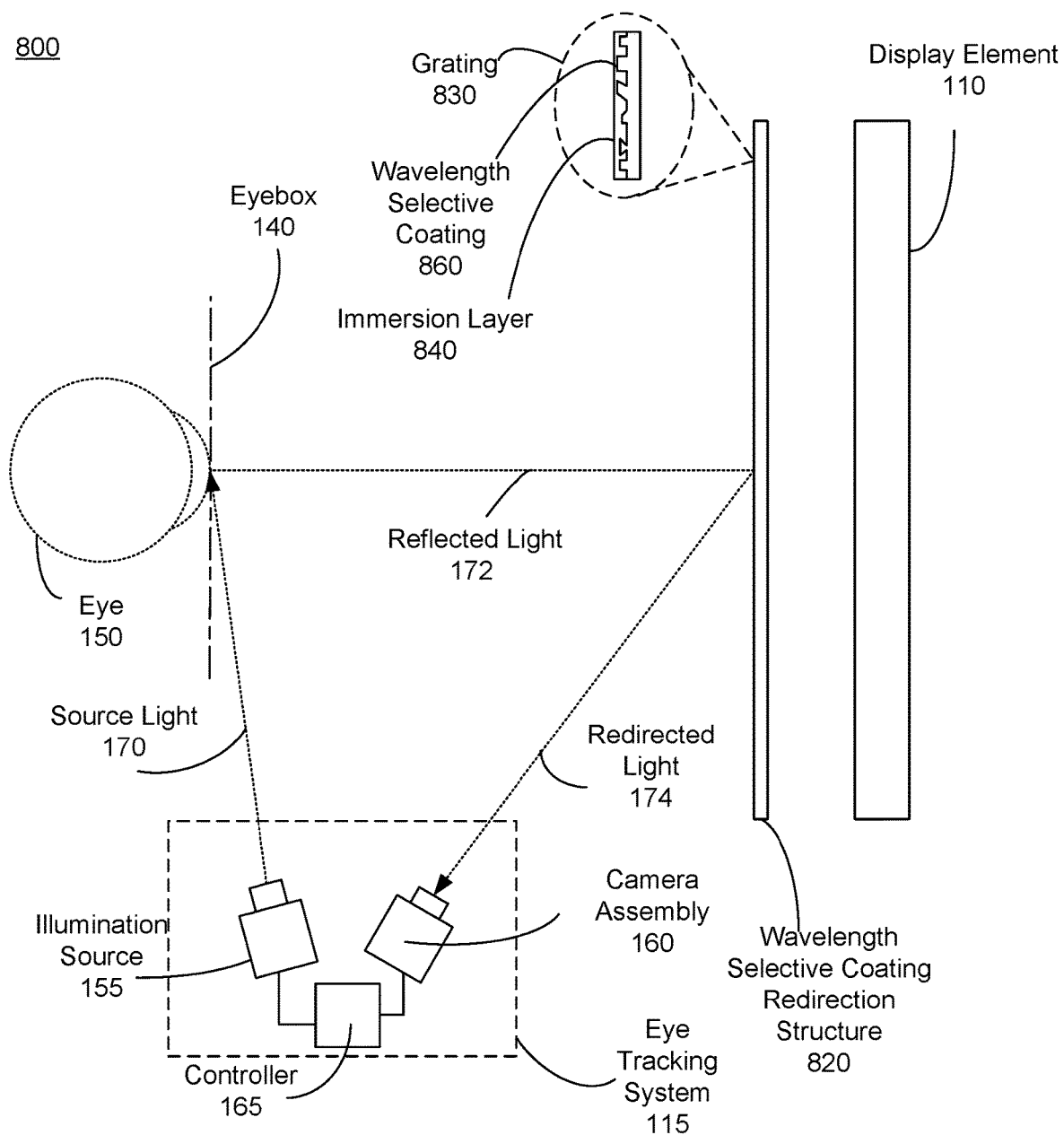
FIG. 8 is a cross section of a portion of a display block of an HMD with a wavelength selective coating redirection structure, in accordance with an embodiment.

FIG. 8 is a cross section 800 of a portion of a display block of an HMD (not shown) with a wavelength selective coating redirection structure, in accordance with an embodiment. The display block is substantially similar to the display block of FIG. 1, except that the redirection structure 105 is replaced with the wavelength selective coating redirection structure 820. The redirection structure 820 comprises a grating 830 overmolded with an immersion layer 840. The wavelength selective coating redirection structure 820 has a flat and compact form factor and is useful in eye tracking systems that use infrared light. The wavelength selective coating redirection structure replaces freeform reflectors in AR optics and reduces the need for low efficiency waveguides in display blocks. Wavelength selective coating redirection structures, such as the structure of the embodiment of FIG. 8, are used where transparent substrates are needed to redirect light.

The wavelength selective coating redirection structure 820 redirects the reflected light 172 in the second band toward the camera assembly 160 as redirected light 174. The grating 830 may be a square grating, a sinusoidal grating, have a grating profile of another shape, or have a non-uniform, spatially varying profile (as seen in the embodiment of FIG. 8). The grating is optimized to direct light in the first order to the camera assembly 160. A wavelength selective coating 860 is applied to the surface of the grating 830. The wavelength selective coating 860 is configured to reflect light in the second band (e.g., a hot mirror configured to reflect infrared light) and transmit light in the first band. The wavelength selective coating 860 may be a vacuum coating (e.g., a Sputtering coating). In one embodiment, the wavelength selective coating 860 is a film laminated onto the grating surface. In this embodiment, the pitch between topographical elements on the grating is large enough to accommodate the wavelength selective coating 860.

The grating 830 redirects light in the second band toward the camera assembly 160, while being substantially transmissive to light in the first band. Note, that in some embodiments, the grating 830 and the wavelength selective coating redirection structure 820 may have a relatively high index of refraction (e.g., >2.5). The high index of refraction allows for more refraction of light in the second band reflecting from a dichroic coating on a prism facet at the air-coating interface. Accordingly, the camera assembly 160 may be placed closer along the Z direction to the wavelength selective coating redirection structure 820, potentially resulting in a smaller form factor for the display block 800.

The grating 830 is overmolded with an immersion structure 840. The immersion structure 840 is composed of a material with the same refractive index as that of the grating 830. In some embodiments, the immersion structure 840 is also made out of the same material (e.g., a UV curable material) as the grating 830. In other embodiments, the immersion structure 840 is a glue.

The immersion structure 840 reduces optical aberrations that would otherwise occur in light in the first band passing through the grating 830 toward the eyebox 140. This is because light from the display 110 and the environmental light 240 interact with the redirection structure as a single piece of material (the immersion structure is index matched to the grating). Note—as shown an outer surface of the immersion structure (i.e., air-structure interface) is substantially flat. Accordingly, light in the first band is not substantially affected by transmission through the wavelength selective coating redirection structure 820. Note in alternate embodiments, the outer surface may be curved (e.g., concave, convex, freeform, etc.) to, e.g., adjust optical power of the light in the first band being transmitted toward the eyebox 140. In some embodiments, the wavelength selective coating redirection structure 820 is coupled to a substrate. This substrate can also be flat, curved, or some other shape.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A redirection structure comprising:
a prism array that spans a diameter of the redirection structure, the redirection structure located between a display element and an eyebox, the display element configured to emit image light in a visible band towards a display element side of the redirection structure, the prism array including a plurality of prisms that are overmolded with an immersion layer that is index matched to the plurality of prisms and forms a flat surface on the eyebox facing side of the immersion layer, each of the plurality of prisms are transmissive in the visible band of light and reflective in an infrared band of light and have an index of refraction greater than 2.5, and a respective shape of each of the plurality of prisms is such that it reflects light in the infrared band received from the eyebox to a first position that is offset from the eyebox, and
wherein the first position is occupied by a camera of an eye tracking system and light in the infrared band is reflected from an eye in the eyebox and redirected by the prism array toward the first position.

2. The redirection structure of claim 1, wherein the prism array includes at least two prisms that have different shapes.

3. The redirection structure of claim 1, wherein each prism of the plurality of prisms includes at least one flat facet.

4. The redirection structure of claim 1, wherein each prism of the plurality of prisms includes at least one curved facet.

5. The redirection structure of claim 1, wherein a size of a prism within the prism array is based in part on a distance between the redirection structure and the display element.

6. The redirection structure of claim 1, wherein facets of prisms within the prism array are shaped such that the facets form different portions of a Fresnel lens.

7. The redirection structure of claim 1, wherein a prism of the plurality of prisms comprises facets that are coated with a dichroic material that is reflective in the infrared band and transmissive in the visible band.

8. The redirection structure of claim 1, wherein the prism array is coated with a layer of material that is a same refractive index as the refractive index of the material of which the plurality of prisms is composed.

9. A head-mounted display (HMD) comprising:
a display element configured to output image light in a visible band of light through a display surface;
a redirection structure configured to transmit light in the visible band from a display element side of the redirection structure to an eyebox side of the redirection structure and direct light in an infrared band different than the visible band to a first position, the redirection structure located between the display element and an eyebox, the redirection structure comprising:
a prism array that spans a diameter of the redirection structure, the prism array including a plurality of prisms that are overmolded with an immersion layer that is index matched to the plurality of prisms and forms a flat surface on the eyebox facing side of the immersion layer, each of the plurality of prisms are transmissive in the visible band of light and reflective in the infrared band of light and have an index of refraction greater than 2.5, and a respective shape of each of the plurality of prisms is such that it reflects light in the infrared band received from the eyebox to the first position that is offset from the eyebox, and
an illumination source configured to illuminate portions of the eyebox with the light in the infrared band; and
a camera located in the first position, the camera configured to capture the light in the infrared band that is reflected from an eye in the eyebox and redirected by the prism array to the first position.

10. The HMD of claim 9, wherein the prism array includes at least two prisms that have different shapes.

11. The HMD of claim 9, wherein each prism of the plurality of prisms includes at least one flat facet.

12. The HMD of claim 9, wherein each prism of the plurality of prisms includes at least one curved facet.

13. The HMD of claim 9, wherein a size of a prism within the prism array is based in part on a distance between the redirection structure and the display element.

14. The HMD of claim 9, wherein facets of prisms within the prism array are shaped such that the facets form different portions of a Fresnel lens.

15. The HMD of claim 9, wherein a prism within the prism array comprises facets that are coated with a dichroic material that is reflective in the infrared band and transmissive in the visible band.

16. The HMD of claim 9, wherein the prism array is coated with a layer of material that is a same refractive index as the refractive index of the material of which prisms within the prism array are composed.

* * * * *